United States Patent [19]

Quagline

[11] Patent Number: 5,427,300
[45] Date of Patent: Jun. 27, 1995

[54] APPARATUS FOR FRAMING VEHICLE BODIES

[75] Inventor: James R. Quagline, Livonia, Mich.

[73] Assignee: Progressive Tool & Industries Co., Southfield, Mich.

[21] Appl. No.: 216,165

[22] Filed: Mar. 22, 1994

[51] Int. Cl.$^6$ ............... B23K 37/04; B23K 101/00; B62D 65/00
[52] U.S. Cl. ................ 228/4.1; 228/49.1; 228/49.6
[58] Field of Search ............ 228/49.1, 49.8, 4.1, 228/49.6

[56] References Cited

U.S. PATENT DOCUMENTS

| | | | |
|---|---|---|---|
| 3,968,558 | 7/1976 | Sekine et al. | 29/429 |
| 4,162,387 | 7/1979 | De Candia . | |
| 4,256,947 | 3/1981 | De Candia . | |
| 4,392,601 | 7/1983 | Fujikawa et al. | 228/4.1 |
| 4,400,607 | 8/1983 | Wakou et al. | 219/79 |
| 4,404,451 | 7/1983 | Niikawa et al. . | |
| 4,442,335 | 4/1984 | Rossi | 228/4.1 |
| 4,466,765 | 8/1984 | Mautino | 414/284 |
| 4,483,476 | 11/1984 | Fujikawa et al. . | |
| 4,494,687 | 1/1985 | Rossi . | |
| 4,535,927 | 8/1985 | Matsubara et al. . | |
| 4,548,346 | 10/1985 | Kraus et al. . | |
| 4,573,626 | 3/1986 | Nishiyama . | |
| 4,600,136 | 7/1986 | Sciaky et al. . | |
| 4,606,488 | 8/1986 | Yanagisawa . | |
| 4,609,137 | 7/1986 | DeFilipps . | |
| 4,614,456 | 7/1986 | Cattani | 29/568 |
| 4,629,109 | 12/1986 | Matsushita . | |
| 4,659,895 | 4/1987 | DiRosa | 219/79 |
| 4,667,866 | 5/1987 | Tobita et al. . | |
| 4,670,961 | 6/1987 | Fontaine et al. | 29/430 X |
| 4,673,785 | 6/1987 | Damiani . | |
| 4,675,969 | 6/1987 | Sciaky et al. | 29/281.4 |
| 4,678,110 | 7/1987 | Handa . | |
| 4,682,722 | 7/1987 | Bossotto et al. . | |
| 4,693,358 | 7/1987 | Kondo et al. | 29/430 |
| 4,719,328 | 1/1988 | Yanagisawa et al. | 228/45 |
| 4,734,979 | 4/1988 | Sakamoto et al. | 29/430 |
| 4,738,387 | 4/1988 | Jaufmann et al. . | |
| 4,740,133 | 4/1988 | Kawano | 228/45 |
| 4,744,500 | 5/1988 | Hatakeyama et al. | 228/45 X |
| 4,751,995 | 6/1988 | Naruse et al. . | |
| 4,757,607 | 7/1988 | Sciaky et al. | 29/771 |
| 4,767,046 | 8/1988 | Kumagai et al. | 228/4.1 |
| 4,776,084 | 10/1988 | Naruse et al. | 29/799 |
| 4,795,075 | 1/1989 | Pigott et al. . | |
| 4,800,249 | 1/1989 | Di Rosa | 219/79 |

(List continued on next page.)

FOREIGN PATENT DOCUMENTS 2153753 8/1985 United Kingdom .

Primary Examiner—Kenneth J. Ramsey
Attorney, Agent, or Firm—Basile and Hanlon

[57] ABSTRACT

A framing apparatus that accurately and efficiently clamps and welds a loosely assembled vehicle body with a high degree of repeatability between consecutive vehicle bodies while also having the ability to adapt to a plurality of different, predetermined loosely assembled vehicle body configurations in a quick and efficient manner. The framing apparatus provides a first and second framing means that move between a raised position for introducing and removing the vehicle body from a welding station and a lowered position for clamping and welding the loosely assembled vehicle body. The first and second framing means are pivotally connected to a carriage which is supported on a pair of substantially parallel inner rails for movement along a first path of travel. A pair of substantially outer rails support the first and second framing means for movement along the first path of travel when in the raised position. The outer rails contain a movable portion within the welding station which movably support the first and second framing means between the raised position and the lowered position. When the first and second framing means are in the lowered position, a means for releasably locating the ends of the first and second framing means is provided to locate and secure the first and second framing means in a fixed relationship relative to the welding station. A means for interchanging the first and second framing means is provided to adapt to a plurality of different, predetermined loosely assembled vehicle body configurations.

31 Claims, 3 Drawing Sheets

APPARATUS FOR FRAMING VEHICLE BODIES

FIELD OF THE INVENTION

The present invention relates to a production line framing apparatus for clamping and welding a loosely assembled vehicle body, and more particularly, a framing apparatus that accurately positions and locates predetermined areas of a loosely assembled vehicle body for accurately clamping and welding the vehicle body with a high degree of repeatability amongst consecutive vehicle bodies wherein the framing apparatus can adapt to a plurality of different, predetermined vehicle body configurations in a quick and efficient manner.

BACKGROUND OF THE INVENTION

The construction of a so called unitized automobile body commences with the formation of individual major panels by stamping the panels from a sheet metal blank. Typically, these major panels include a floor panel, right and left body side panels, a fire wall and either a roof panel or transversely extending header members upon which a roof panel is subsequently mounted. After the individual panels are stamped, some preliminary assembly operations may be performed on the individual panels as, for example, adding door hinge and latch hardware to the body side panels such at appropriate locations on the door opening, adding seat mounting brackets and reinforcements to the floor panel, etc.

A set of panels which are to constitute a subassembly of the finished vehicle body are then brought together and loosely assembled to each other. This initial loose assembly frequently is accomplished by a so-called toy tab arrangement in which one panel is formed with a tab projecting from one edge which is received in a slot of an adjacent panel. This technique interlocks the panels and frame members to each other to form a loosely assembled vehicle body wherein the panels and frame members will not separate from each other, but the panels and frame members may tilt or move relative to one another. The loosely assembled subassembly is then brought to a welding station which welds the various panels and frame members to each other in a rigid, permanently assembled relationship.

This initial welding step is one of the most important steps in the assembly of the vehicle body because it establishes the final assembled alignment of the various panels and headers to each other which is essential to subsequent assembly operations performed on the subassembly. It is thus essential that the various panels and headers be precisely and accurately located relative to one another and held fixedly in the desired positions during the welding operation. The positioning of the various panels and header members during the welding operation is accomplished by clamping frames which carry a plurality of individual clamps arranged to clamp various body components in the desired position.

Because the relative positioning of the various panels and headers is critical, it is desirable to perform as many welding operations as possible within the same welding station since the vehicle body will be relocated and reclamped at subsequent stations along the production line. Due to variations between assembly stations and variation and movement of the various panels and headers, it is almost impossible to relocate and reclamp the vehicle body without stacking up tolerances or creating variances amongst the relative positioning of the various panels and headers. Therefore, it is desirable to frame as much of the vehicle body as possible within the same welding station so that a maximum number of welding operations can be performed on the vehicle body without having to clamp and relocate the vehicle body, which may increase the tolerances between the relative positioning of the various panels and headers of the vehicle body and decrease the repeatability between consecutive vehicle bodies.

To accomplish this task, programmable robotic welders have been utilized to perform several welds at different locations on the vehicle body at one welding station. The programmable robotic welders are typically located at opposite sides of the conveying line at the welding station, and when the vehicle body subassembly is located at the welding station, the head of one welder may, for example, be extended to pass through the door opening to apply several tack welds along the seam between the body side panel and the floor panel. In those cases where the clamping frames are positioned at opposite sides of the vehicle body, clearance problems may restrict motion of the welding head which must pass through the clamping frame before it has access to the vehicle body. This can require that the portions of the vehicle body that could not be accessed by the welding head at a first welding station must be accessed at a subsequent, second welding station. Again, this is an undesirable situation since the vehicle body must be relocated and reclamped at the subsequent, second welding station thereby increasing the amount of tolerances which may occur between the relative positioning of the various panels and headers of the vehicle body and decreasing the amount of repeatability between consecutive vehicle bodies.

Another problem which arises where separate clamping frames are employed at opposite sides of the vehicle body is that the two clamping frames may be independently located in a predetermined relationship relative to each other and to the position occupied by the vehicle body which the frames are to clamp. Since such separate clamping frames are not directly connected to one another, they must utilize a common reference that is either defined by a spacial orientation or via a fixture or linkage assembly. These types of systems exhibit problems with repeatability as such referencing techniques inherently create tolerance build ups within the systems due to repeated movements, thermo expansion and contraction, wear, etc. When such separate clamping frames are changed to accommodate different vehicle body configurations, the problems with repeatability are magnified.

In today's automotive industry, it is common for one particular car model to have several different body styles. This requires different clamping and welding locations as well as access areas in which clamping and welding apparatus may be extended therethrough. To prohibit having to supply separate assembly lines and welding stations for each body style of the particular car model, the welding stations must be able to adapt to a plurality of different body styles in a quick and efficient manner while ensuring the accuracy and repeatability that are required of the welding process.

Programmable robots have been utilized to compensate for the different body styles while others have utilized manual welders to complete the welds that are not common with the other body styles. Obviously, manual welding is an inefficient process, and the programmable robots still require the use of a clamping means to support the vehicle body during the welding process. Some applications have fixedly mounted a clamping means on the end of a programmable robotic arm so that the clamping means can also adapt to a plurality of different body styles, but not all applications are receptive to such a device. Access, cost and efficiency typically favor the clamping means to be independent of the programmable robotic arm. Thus, it would be desirable to have a framing apparatus that adapts to a plurality of different vehicle body styles in an efficient manner.

SUMMARY OF THE INVENTION

The present invention solves the above short comings by providing a framing apparatus that accurately and efficiently clamps and welds a loosely assembled vehicle body with a high degree of repeatability between consecutive vehicle bodies while also being able to adapt to a plurality of predetermined, different loosely assembled vehicle body configurations in a quick and efficient manner. The framing apparatus provides a first and second framing means that move between a raised position for introducing and removing the vehicle body from a welding station and a lowered position for clamping and welding the loosely assembled vehicle body. The first and second framing means are pivotally connected to a carriage which is supported on a pair of substantially parallel inner rails for movement along a first path of travel. A pair of substantially outer rails support the first and second framing means for movement along the first path of travel when in the raised position. The outer rails contain a movable portion within the welding station which movably support the first and second framing means between the raised position, wherein the movable portion of the outer rails are linearly aligned with the remainder of the outer rails, and the lowered position, wherein the movable portion of the outer rails is displaced from the remainder of the outer rails. A means for manipulating movement of the movable portion of the outer rails is provided to move both the movable portion of the outer rails and the first and second framing means between the raised position and the lowered position. When the first and second framing means are in the lowered position, a means for releasably locating the ends of the first and second framing means is provided to locate and secure the first and second framing means in a fixed relationship relative to the welding station. The framing apparatus also provides a means for interchanging the first and second framing means to adapt to a plurality of different, predetermined loosely assembled vehicle body configurations.

In the preferred embodiment, the first and second framing means each have a top portion and a bottom portion wherein the top portions are pivotally connected to the carriage for pivotal movement about a horizontal pivot axis that is substantially parallel to the first path of travel. When in the lowered position, the bottom portions of the first and second framing means are detachably located to the releasable locating means which is connected to the floor of the welding station in a predetermined, fixed position. In another form, the releasable locating means may be connected directly to a conveying means which moves the vehicle body to and from the welding station along a second path of travel. By having the top portions of the first and second framing means connected to a common pivot axis and by securing the bottom portion of the first and second framing means to a fixed, predetermined position, both accuracy and repeatability are enhanced.

The interchanging means utilizes a plurality of first and second framing means each having a carriage for providing movement of the plurality of first and second framing means along the first path of travel. When the framing means at the welding station is not adapted for use on the vehicle body that has entered the welding station, the plurality of framing means and their associated carriages move along the first path of travel until the proper framing means adapted for the loosely assembled vehicle body at the welding station is located at the welding station.

To this end, the objects of the present invention are to provide a new and improved framing apparatus for clamping and welding a loosely assembled vehicle body with a high degree of repeatability and accuracy; and to provide a new and improved framing apparatus that provides efficient means for adapting to a plurality of different, predetermined loosely assembled vehicle body configurations.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
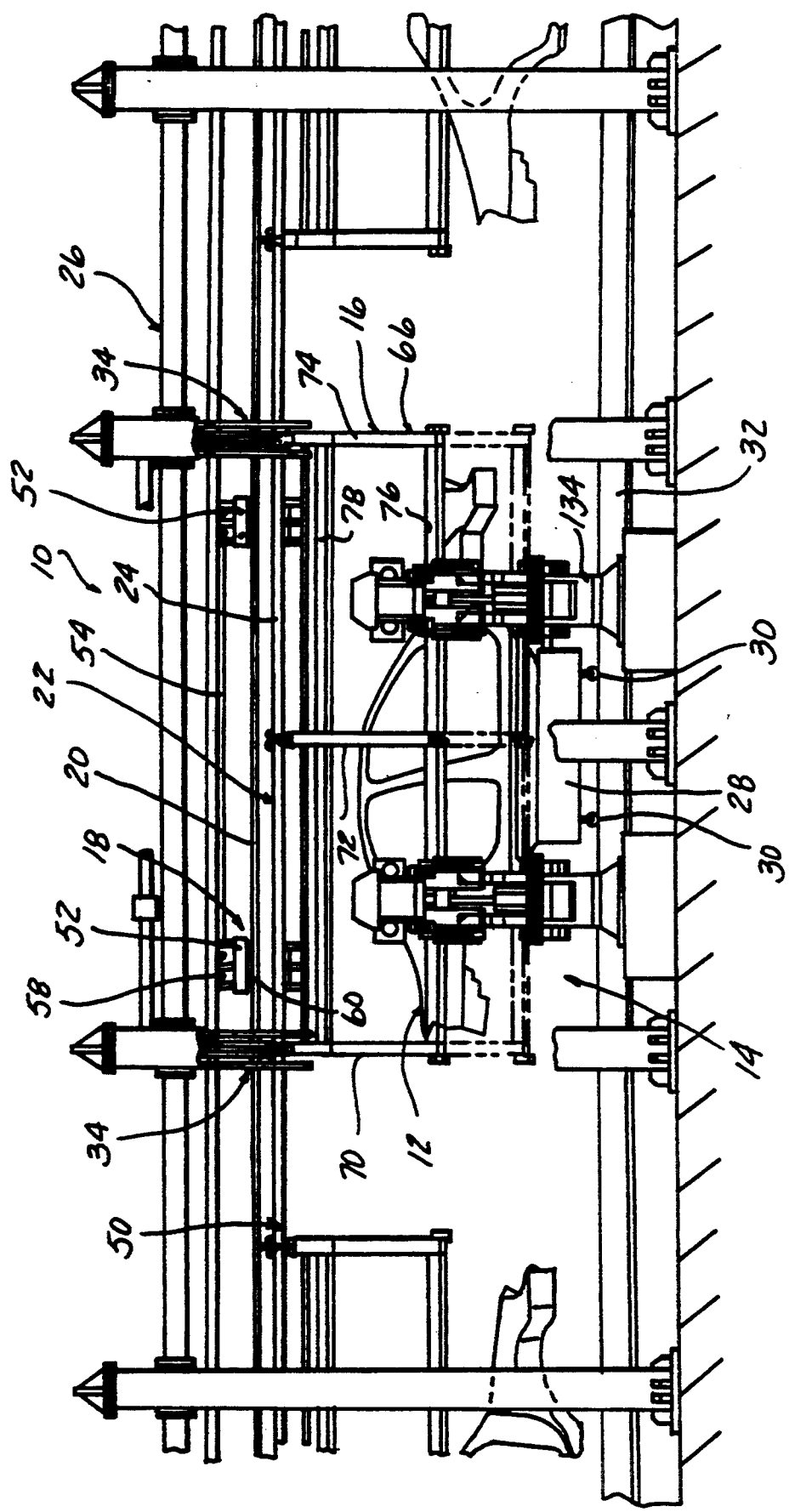
FIG. 1 is a front view of a welding station showing a framing apparatus of the present invention in a raised position and showing, in phantom, a framing assembly of the framing apparatus in a lowered position.
Figure 2:
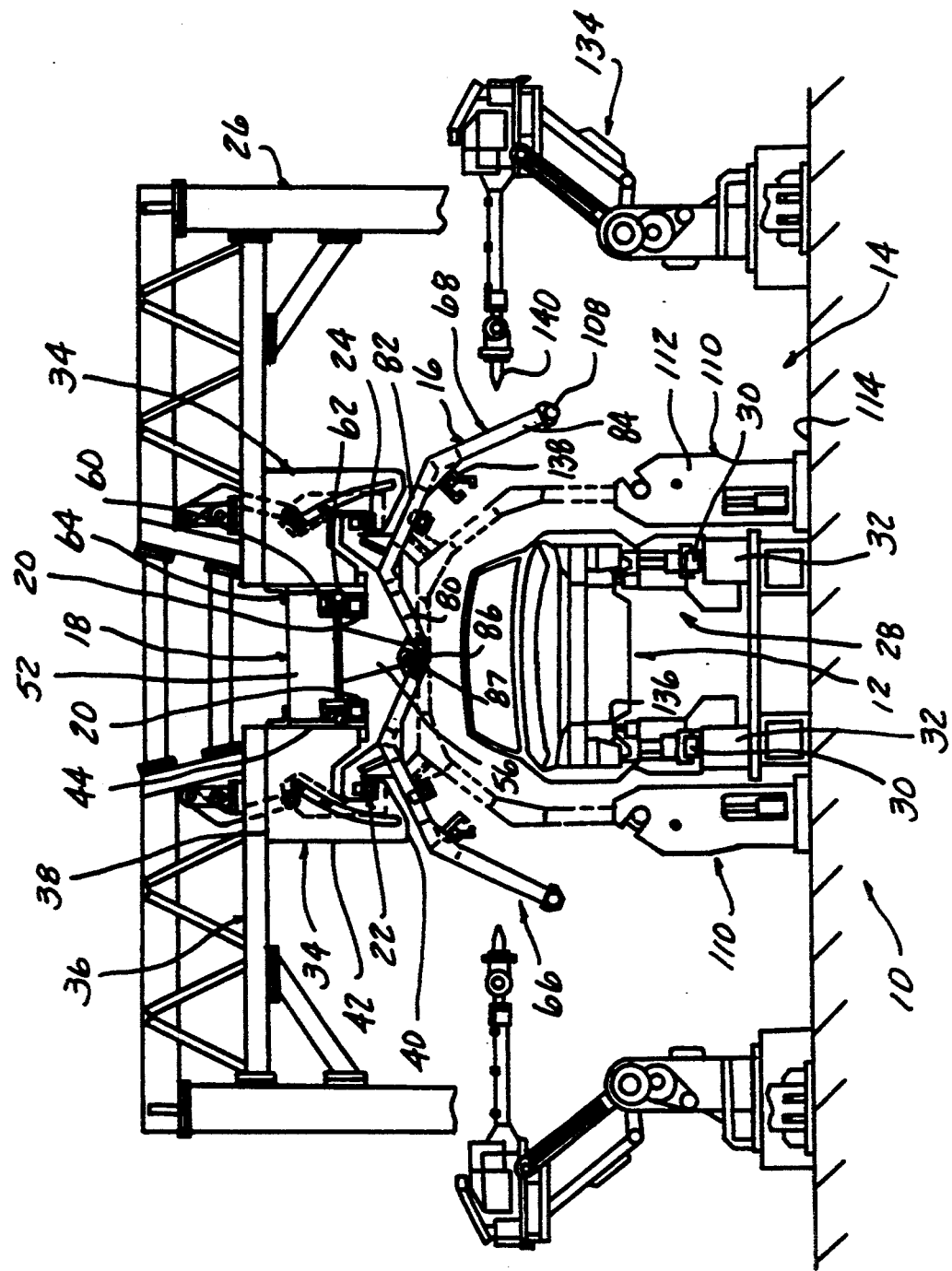
FIG. 2 is a side view of the welding station showing the framing apparatus in the raised position and showing, in phantom, the framing assembly and outer rails of the framing apparatus in the lowered position.

FIGS. 1 and 2 show a framing apparatus 10 of the present invention utilized for welding and clamping a loosely assembled vehicle body 12 at a welding station 14. The framing apparatus 10 has a framing assembly 16 that moves between a raised position, wherein the vehicle body 12 is introduced and removed from the welding station 14 by a conventional conveying means, and a lowered position, wherein the loosely assembled vehicle body 12 is accurately positioned for the clamping and welding thereof. A clamping means is connected to the framing assembly 16 for clamping predetermined areas of the loosely assembled vehicle body 12, and a welding means is provided at the welding station 14 for cooperatively engaging the clamping means and welding the loosely assembled vehicle body 12. The framing assembly 16 is pivotally connected to a carriage 18, and the carriage 18 is supported by a pair of inner rails 20 for movement along a first path of travel. A pair of outer rails 22 aid in supporting the framing assembly 16 for movement along the first path of travel when in the raised position. A manipulating means moves a movable portion 24 of the outer rails 22 at the welding station 14 between the lowered position and the raised position which in turn moves the framing assembly 16 between the lowered position and the raised position. When in the lowered position, a releasable locating means releasably locates the framing assembly 16 in a fixed, predetermined position relative to the welding station 14.

In order to support the framing apparatus 10, an overhead support structure 26 is provided with an inverted u-shaped configuration that extends longitudinally along the first path of travel. The welding station 14 utilizes only a portion of the support structure 26, preferably, a centrally located portion of the support structure 26. Thus, the support structure 26 extends fore and aft from the welding station 14 along the first path of travel.

The vehicle body 12 is introduced and removed from the welding station 14 by the conveying means which provides a carrier 28 for supporting and locating the vehicle body 12 in a predetermined position relative to the conveying means. The carrier 28 is rollably supported by rollers 30 that engage a pair of rails 32 for movement along a second path of travel. Preferably, the first and second paths of travel are substantially parallel. The vehicle body 12 has a front to rear axis that is also substantially parallel to the first and seconds path of travel. In an additional embodiment, the front to rear axis of the vehicle body 12 may be substantially perpendicular to both the first and second paths of travel. In another embodiment, the second path of travel may be substantially perpendicular to the first path of travel while the front to rear axis of the vehicle body 12 may be substantially parallel to the second path of travel and substantially perpendicular to the first path of travel. In yet another embodiment, the first and second paths of travel may be substantially perpendicular to one another while the front to rear axis of the vehicle body 12 is substantially perpendicular to the second path of travel and substantially parallel to the first path of travel.

Figure 5:
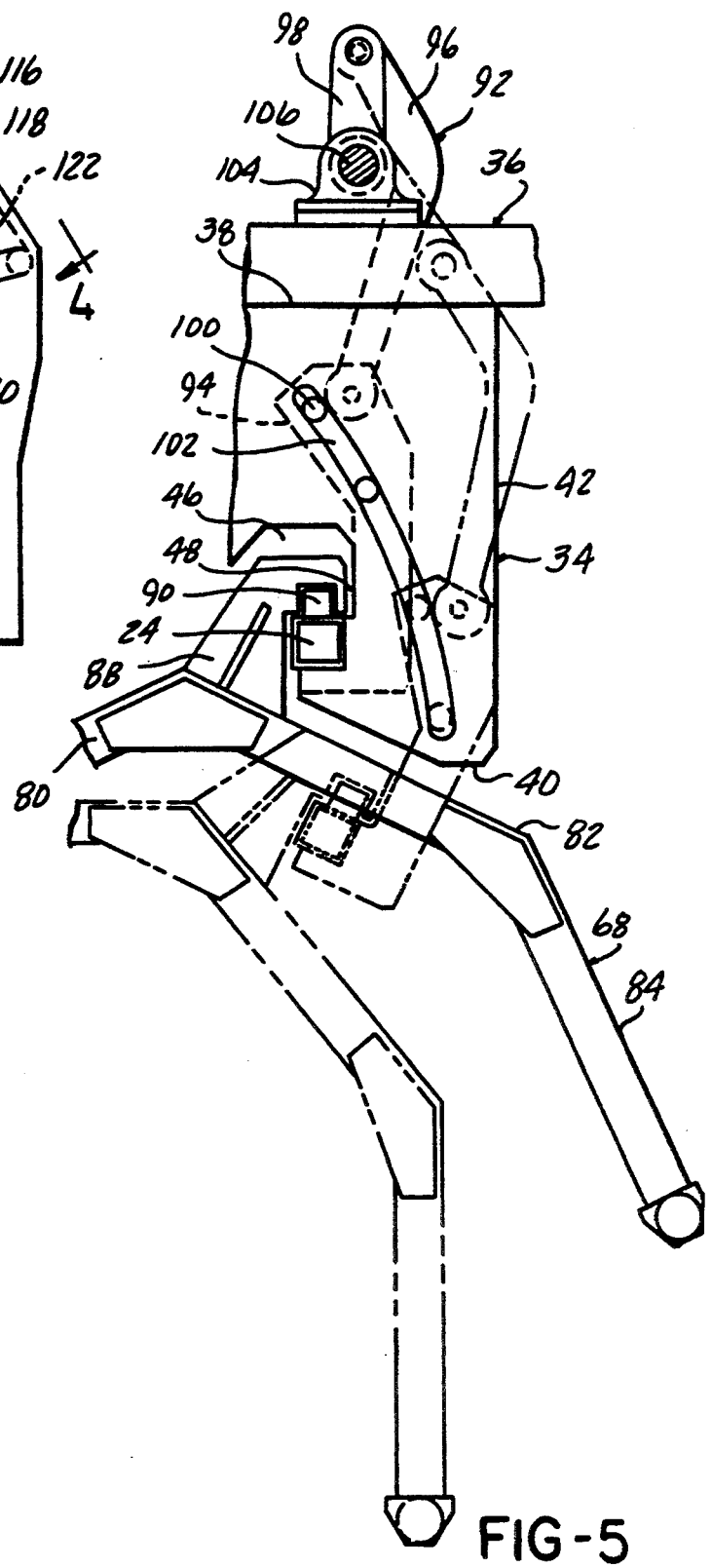
FIG. 5 is an enlarged, detailed side view of a manipulating means of the framing apparatus shown in the raised position and shown, in phantom, the manipulating means in the lowered position.

The framing apparatus 10 is further supported by a plurality of paired support extensions 34 connected to an overhead portion 36 of the support structure 26 at spaced intervals along the first path of travel. As seen in FIGS. 2 and 5, each support extension 34 has a trapezoidal configuration having a top side 38, a bottom side 40, an outside surface 42 and an inside surface 44. Two of the paired support extensions 34 are connected to the support structure 26 at each end of the welding station 14 by having their top sides 38 connected to the overhead portion 36 of the support structure 26. The support extensions 34 extend vertically downward so that the inside surfaces 44 of each pair of support extensions 34 are substantially parallel and horizontally spaced a predetermined distance from one another. The inner rails 20 are connected to the inside surfaces 44 of the support extensions 34 such that the inner rails 20 are substantially parallel and extend along the entire length of the support structure 26.

As seen in FIGS. 1, 2 and 5, the support extensions 34 have a notch 46 provided in the bottom surface 40 of the support extensions 34. The outer rails 22 are connected to a surface 48 of the support extension 34 that defines the notch 46. The outer rails 22 are substantially parallel, are spaced a predetermined horizontal distance from one another and extend the entire length of the support structure 26. A portion of the outer rails 24 located at the welding station 14 are movable to a position displaced from a remaining portion 50 of the outer rails 22. The movement of the movable portion 24 of the outer rails 22 is provided by the manipulating means.

To support the framing assembly 16 of the framing apparatus 10, the framing assembly 16 is pivotally connected to the carriage 18, and the carriage 18 is rollably supported by the inner rails 20, as seen in FIGS. 1 and 2. The carriage 18 has a pair of support blocks 52 at each end of the welding station 14 with a pair of stabilizing bars 54 connected to and extending between the support blocks 52. A triangular portion 56 of the carriage 18 is integral with and extends downward from each support block 52 for pivotally connecting the framing assembly 16. Each support block 52 of the carriage 18 has two pair of rollers 58, 60 on opposite sides of the top and bottom of the support blocks 52. The rollers 60 on the bottom of the support blocks 52 rollably engage two cylindrical rods 62 that are connected to and extend along the top surface of the inner rails 20. A flange 64 is connected to and extends substantially perpendicular from the inside surfaces 44 of each of the support extensions 34 and extends along the entire length of the support structure 26. The rollers 58 on the top of the support blocks 52 rollably engage the flanges 64 for movement along the first path of travel.

As previously discussed, repeatability may be enhanced by performing as many welds as possible without having to reclamp and relocate the vehicle body 12. This is accomplished by framing a maximum amount of the vehicle body 12 and providing a maximum amount of access for clamping and welding the vehicle body 12 at the welding station 14. The framing assembly 16 has a first framing section 66 and a second framing section 68 that are substantially similar and which provide clamping and welding access to a majority of the vehicle body 12. As seen in FIGS. 1, 2 and 5, each framing section 66, 68 has three substantially parallel, angular support members 70, 72, 74 that extend vertically and are horizontally spaced with two substantially parallel horizontal support members 76, 78 extending substantially perpendicular between the ends of the three angular support members 70, 72, 74. Each angular support member 70, 72, 74 has three linear integral members (top, middle and bottom portions 80, 82, 84, respectively) that extend at substantially 45° angles relative to one another such that the top portion 80 and the bottom portion 84 of the angular support members 70, 72, 74 are substantially perpendicular to one another. Thus, when in the lowered position, the framing assembly 16 creates a 180° envelope in which to frame a majority of the vehicle body 12.

Repeatability is also enhanced by physically connecting the framing sections 66, 68 of the framing assembly 16. As seen in FIG. 2, the top portions 80 of the framing sections 66, 68 have brackets (not shown) extending therefrom which are pivotally connected to the triangular portion 56 of the carriage 18 by a pivot pin 86 which defines a pivot axis 87 that is substantially parallel to the first path of travel. The pivot pin 86 connects the framing sections 66, 68 structurally so that the relative positioning of the top portion 80 of the framing sections 66, 68 never varies, therefore, repeatability between consecutive vehicle bodies 12 is enhanced. In another embodiment, the top portion 80 of the framing sections 66, 68 pivot about different pivot axes (not shown) wherein the pivot axes are fixedly spaced at a predetermined distance within the carriage 18.

To further support the framing assembly 16, a flange 88 is connected to and extends from the middle portion 82 of each of the angular support members 70, 72, 74 of the first and second framing sections 66, 68, as best seen in FIG. 5. A roller 90 is rollably supported by each flange 88 so that the roller 90 rollably engages a top surface of the outer rails 22 for movement along the first path of travel when in the raised position. The rollable engagement also allows the outer rails 24 at the welding station 14 to support the framing assembly 16 when moving between the raised position and the lowered position.

To move the framing assembly 16 between the raised position and the lowered position, the manipulating means provides a linkage assembly 92 housed and supported in each of the support extensions 34 at the welding station 14 and driven by a power means, as seen in FIG. 5. The linkage assembly 92 utilizes three linkage members 94, 96, 98 wherein the first linkage member 94 is fixedly connected to the movable portion 24 of the outer rails 22. The first linkage member 94 also has a pair of guide pins 100 extending outward from the first linkage member 94 and slidably engaging an arcuate slot 102 provided in the support extension 34. The guide pins 100 move within the arcuate slot 102 to guide the first linkage member 94 and the framing assembly 16 when moving between the raised position and the lowered position. The first linkage member 94 is pivotally connected to a second linkage member 96 which in turn is pivotally connected to a third linkage member 98. The third linkage member 98 is pivotally connected to a bracket 104 that is mounted to the support structure 26. A shaft 106 is coupled to the third linkage member 98 through the bracket 104, and a motor (not shown) powers the rotation of the shaft 106 to move the linkage assembly 92 between the raised position and the lowered position which in turn moves the movable portion 24 of the outer rails 22 and the framing sections 66, 68.

Repeatability of the framing apparatus 10 is also enhanced by having a means for releasably locating the bottom portion 84 of the framing sections 66, 68 in the lowered position to locate the bottom portion 84 of the framing sections 66, 68 in a fixed, predetermined position relative to the welding station 14 and the pivot axis 87. As seen in FIG. 2, the locating of the bottom portions 84 of the framing sections 66, 68 and the common pivot axis 87 shared by the top portion 80 of the framing sections 66, 68 provide three locating points to establish a plane. The plane is extended along the first path of travel. A spool 108 extends from and is connected to the ends of the bottom horizontal support member 76 of the first and second framing sections 66, 68. The spools 108 are received by locators 110 that locate the spools 108 in a predetermined fixed position relative to the welding station 14 and the pivot axis 87 and secure the spools 108 within the locators 110 during the clamping and welding of the loosely assembled vehicle body 12. Each locator 110 provides a housing 112 that is anchored to a floor 114 of the welding station 14 in a predetermined fixed position. In another form, the housing 112 of the locator 110 may be connected to the carrier 28 in a predetermined position relative to the carrier 28 so that the locator 110 travels with the carrier 28. This requires that the carrier 28 be accurately positioned relative to the welding station 14.

Figure 3:
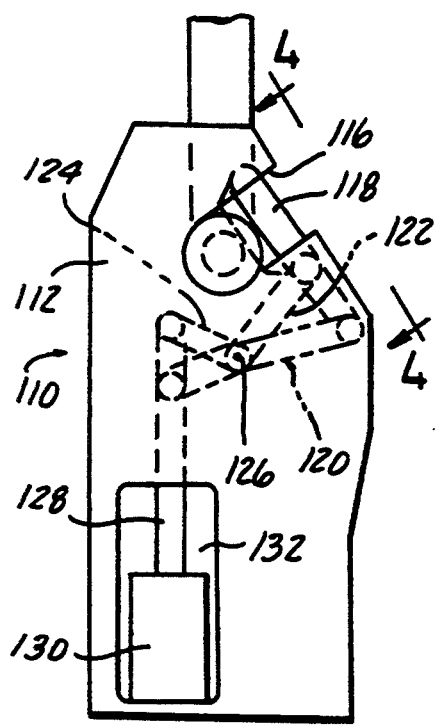
FIG. 3 is an enlarged, detailed side view showing a locator of the framing apparatus releasably locating a spool on a bottom portion of the framing section in the lowered position.
Figure 4:
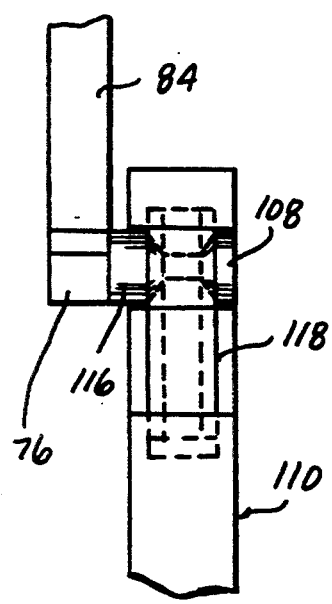
FIG. 4 is a section view in the direction of arrows 4—4 in FIG. 3 showing the mating configurations of the spool and the locator.

As seen in FIG. 3, the housing 112 of the locator 110 extends vertically upward and has an irregular configuration that can best be described as a substantially rectangular configuration with the top corners of the rectangular configuration tapering inward toward each other. A u-shaped slot 116 is provided in the housing 112 of the locator 110 for receiving the spool 108 in the lowered position. The spool 108 and the slot 116 of the locator 110 have mating configurations such that the spool 108 is snugly located in the bottom of the slot 116. The spool 108 has a cylindrical geometry that tapers inward from both ends of the spool to form a smaller cylindrical geometry in the center of the spool 108, as seen in FIG. 4. The slot 116 has a mating configuration such that the portion of the locator 110 that defines the slot 116 tapers inward from the edges of the slot 116 to form a plateau that extends outward into the opening of the slot 116 to mate with the geometric configuration of the spool 108.

In order to secure and retain the spool 108 within the slot 116 of the locator 110, a finger 118 moves across the slot 116 to close the opening of the slot 116 and prohibit the spool 108 from exiting the slot 116 when clamping and welding the loosely assembled vehicle body 12, as seen in FIGS. 3 and 4. The finger 118 is connected to a linkage assembly 120 that is housed within the housing 112 of the locator 110. The linkage assembly 120 has a first linkage member 122 pivotally connected to the finger 118 which in turn has a second linkage member 124 rigidly connected to the other end of the first linkage member 122. The connection between the first linkage member 122 and the second linkage member 124 is anchored to the housing 112 by a pivot pin 126 which is fitted through an aperture provided in the housing 112 and press fitted through commonly aligned apertures in the first and second linkage members 122, 124, respectively. A third linkage member 128 is pivotally connected to the other end of the second linkage member 124, and the third linkage member 128 has its other end connected to a linear drive module 130. To have the finger 118 extend across and close the opening of the slot 116, the linear drive module 130 pulls the third linkage member 128 vertically downward so that the linkage assembly 120 slides the finger 118 member across the opening of the slot 116. To open the slot 116, the linear drive module 130 raises the third linkage member 128 vertically upward so that the finger 118 retracts from the slot 116 and into the housing 112. The housing 112 provides an aperture 132 extending therethrough for allowing easy access to the linear drive module 130 for easy maintenance.

To snugly secure the spool 108 within the slot 116 of the locator 110, the finger 118 has a mating configuration with the spool 108. A bottom portion of the finger 118 has sides that tapper inward towards a substantially flat bottom surface. Thus, when the finger 118 extends across the slot 116, the bottom portion of the finger 118 mates with the configuration of the spool 108 to tightly secure the spool 108 within the base of the slot 116.

To accommodate for a plurality of different, predetermined loosely assembled vehicle body configurations, an interchanging means is provided to interchange framing assemblies 16 to provide a framing assembly 16 that will accommodate the loosely assembled vehicle body configuration 12 at the welding station 14. Because the loosely assembled vehicle body configurations 12 are different, they require different clamping and welding locations. The clamping means connected to the framing sections 66, 68 are mounted and orientated in different locations to accommodate for the different clamping and welding areas of each loosely assembled vehicle body configuration 12. Thus, the interchanging means allows for a plurality of different, predetermined loosely assembled vehicle body configurations 12 to be consecutively clamped and welded within the same welding station 14.

The different, predetermined loosely assembled vehicle body configurations 12 are randomly introduced to the welding station 14 by the conveying means. At a prior station, a means for identifying the predetermined vehicle body configuration 12 identifies which one of a plurality of predetermined vehicle body configurations 12 is being introduced to the welding station 14, and a signal is sent notifying the framing apparatus 10 of the approaching predetermined vehicle body configuration 12. The framing apparatus 10 responds to the signal by selecting the proper framing assembly 16 and interchanging the framing assemblies 16 when the vehicle bodies 12 are in transit between stations.

A separate framing assembly 16 and carriage 18 is provided for each loosely assembled vehicle body configuration 12 wherein each framing assembly 16 provides the proper locations for clamping and welding a predetermined vehicle body configuration 12. These alternative framing assemblies 16 and carriages 18 are movably supported on the inner rails 20 and the outer rails 22 of the framing apparatus 10. A means for powering movement of the carriages 18 and framing assemblies 16 powers movement of all of the predetermined framing assemblies 16 and carriages 18 along the first path of travel until the desired framing assembly 16 reaches the welding station 14. The welding means provides programmable robots 134 to respond to the signal sent by the identifying means by loading the proper software welding routine that corresponds with the predetermined loosely assembled vehicle body configuration 12.

The framing operation begins when the loosely assembled vehicle body 12 arrives at the welding station 14. The loosely assembled vehicle body 12 is accurately located on conventional locators 136 within the welding station 14 to position the loosely assembled vehicle body 12 in a fixed orientation relative to the welding station 14 and the pivot axis 87, as seen in FIGS. 1 and 2. The manipulating means then lowers the movable portion 24 of the outer rails 22 which in turn pivotally moves the framing sections 66, 68 from the raised position to the lowered position, as seen in phantom of FIGS. 1, 2 and 5. The spools 108 extending from the bottom portion 84 of the framing sections 66, 68 are received by the locators 110, and the locators 110 engage to drive the finger 118 across the opening of the slot 116 where the spool 108 is received, as seen in FIGS. 3 and 4. The framing assembly 16 is then secured and properly located, and the loosely assembled vehicle body 12 is clamped in the predetermined positions by the clamping means which provides conventional clamps 138 connected to the framing sections 66, 68. Once clamped, the programmable robot 134 moves a laser welder 140 from clamp to clamp 138 to cooperatively engage the clamps 138 for welding the loosely assembled vehicle body 12. Once the welding is completed, the programmable robots 134 are withdrawn, and the clamps 138 unclamp the vehicle body 12. The finger 118 in the locators 110 withdraw to open the slot 116 in the locators 110 and release the spools 108 from the locators 110, as seen in phantom of FIG. 3. The manipulating means then raises the outer rails 24 which in turn raises the framing sections 66, 68 from the lowered position to the raised position by pivoting at the pivot axis 87, as seen in FIGS. 1, 2 and 5. The conveying means removes the welded vehicle body 12 from the welding station 14 by traveling along the first path of travel.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the broadest interpretation so as to encompass all such modifications and equivalent structures as is permitted under the law.

What is claimed is:

1. A framing apparatus for clamping and welding a loosely assembled vehicle body to form a permanently assembled, substantially rigid subassembly comprising:
   means for accurately positioning the loosely assembled vehicle body at a welding station;
   a pair of substantially parallel inner rails defining a first path of travel;
   a carriage supported by said pair of inner rails for movement along said first path of travel;
   first and second means for framing the vehicle body at said welding station wherein said first and second framing means are connected to said carriage for movement between a raised position for introducing and removing the vehicle body from said welding station and a lowered position for clamping and welding the loosely assembled vehicle body;
   a pair of substantially parallel outer rails supporting said first and second framing means when in said raised position; and
   a movable portion of said pair of outer rails at said welding station movable to a position displaced from the remaining portion of said pair of outer rails to move and support said first and second framing means between said raised position and said lowered position.

2. The framing apparatus stated in claim 1 including:
   means for interchanging said first and second framing means to adapt to a plurality of different, predetermined loosely assembled vehicle body configurations.

3. The framing apparatus stated in claim 2 wherein said interchanging means comprises:
   a plurality of said carriages supported by said inner rails for movement along said first path of travel;
   a plurality of said first and second framing means supported by said carriages and said outer rails for movement along the first path of travel when in said raised position, and each of said plurality of first and second framing means adapted for framing a different, predetermined loosely assembled vehicle body configuration; and
   means for powering movement of said plurality of said carriages and said plurality of said first and second framing means along said first path of travel until a predetermined one of said plurality of first and second framing means is located at said welding station for framing a predetermined loosely assembled vehicle body configuration.

4. The framing apparatus stated in claim 1 including: means for releasably locating said first and second framing means in said lowered position.

5. The framing apparatus stated in claim 4 wherein said releasable locating means is connected to said welding station in a fixed, predetermined position.

6. The framing apparatus stated in claim 1 including means for conveying the vehicle body along a second path of travel to and from said welding station.

7. The framing apparatus stated in claim 6 wherein said second path of travel is substantially parallel to said first path of travel.

8. The framing apparatus stated in claim 6 wherein said second path of travel is substantially perpendicular to said first path of travel.

9. The framing apparatus stated in claim 6 including means for releasably locating said first and second framing means in said lowered position, and said releasable locating means being connected to said conveying means in a predetermined position.

10. The framing apparatus stated in claim 1 including means for manipulating movement of said movable portion of said pair of outer rails comprising:
a linkage assembly having one end connected to said movable portion of said outer rails and another end connected to said welding station for supporting movement of said movable portion of said outer rails between said raised position and said lowered position; and
means for powering movement of said linkage assembly between said raised position and said lowered position.

11. A framing apparatus for clamping and welding a loosely assembled vehicle body to form a permanently assembled, substantially rigid subassembly comprising:
means for conveying said vehicle body in a predetermined fixed relationship relative to said conveying means to and from a welding station;
means for accurately positioning the loosely assembled vehicle body at said welding station;
a pair of substantially parallel inner rails defining a first path of travel;
a carriage supported by said pair of inner rails for movement along said first path of travel;
first and second means for framing the vehicle body at said welding station wherein said first and second framing means are pivotally connected to said carriage for pivotal movement about a pivot axis when moving between the raised position for introducing and removing the vehicle body from said welding station and a lowered position for clamping and welding the loosely assembled vehicle body;
a pair of substantially parallel outer rails supporting said first and second framing means for movement of said first and second framing means along said first path of travel when in said raised position;
a portion of said pair of outer rails at said welding station movable to a position displaced from the remaining portion of said pair of outer rails to pivotally move and support said first and second framing means between said raised position and said lowered position; and
means for releasably locating said first and second framing means in said lowered position in a predetermined position.

12. The framing apparatus stated in claim 11 wherein said releasable locating means is fixedly connected to said welding station in a predetermined, fixed position.

13. The framing apparatus stated in claim 11 wherein said releasable locating means is connected to said conveying means in a predetermined position.

14. The framing apparatus stated in claim 13 wherein said conveying means moves along a second path of travel, and said second path of travel is substantially parallel to said first path of travel.

15. The framing apparatus stated in claim 13 wherein said conveying means moves along a second path of travel, and said second path of travel is substantially perpendicular to said first path of travel.

16. The framing apparatus stated in claim 11 including means for interchanging said first and second framing means to adapt to a plurality of different, predetermined loosely assembled vehicle body configurations.

17. The framing apparatus stated in claim 16 wherein said interchanging means comprises:
a plurality of said carriages supported by said inner rails for movement along said first path of travel;
a plurality of said first and second framing means supported by said carriages and said outer rails for movement along said first path of travel when in said raised position, and each one of said plurality of said first and second framing means adapted for framing different predetermined loosely assembled vehicle body configurations; and
means for powering movement of said plurality of said carriages and said plurality of said first and second framing means along said first path of travel when in said raised position until a predetermined one of said plurality of said first and second framing means is located at said welding station for framing a predetermined loosely assembled vehicle body configuration.

18. The framing apparatus stated in claim 11 wherein said first and second framing means each comprise:
a framing section providing access to the loosely assembled vehicle body for clamping and welding the loosely assembled vehicle body;
means for clamping the loosely assembled vehicle body at predetermined locations when said framing section is in said lowered position, and said clamping means connected to said framing section; and
means for welding said vehicle body at predetermined locations when said framing section is in said lowered position.

19. The framing apparatus stated in claim 11 wherein said releasable locating means comprises:
at least one spool connected to each of said first and second framing means; and
means for receiving said spool when in said lowered position to releasably locate said first and second framing means in a fixed orientation relative to said pivot axis.

20. The framing apparatus stated in claim 11 including means for manipulating movement of said movable portion of said pair of outer rails comprising:
a linkage assembly having one end connected to said movable portion of said outer rails and another end connected to said welding station for supporting movement of said movable portion of said outer rails between said raised position and said lowered position; and means for powering movement of said linkage assembly between said raised position and said lowered position.

21. A framing apparatus for clamping and welding a loosely preassembled vehicle body to form a permanently assembled, substantially rigid subassembly comprising:

a carrier for supporting the loosely assembled vehicle body in a predetermined fixed relationship relative to said carrier;

means for accurately positioning the loosely assembled vehicle body at said welding station in a predetermined fixed relationship relative to said welding station;

a pair of substantially parallel inner rails defining a first path of travel;

a carriage supported by said inner rails for movement along said first path of travel;

a framing assembly at said welding station including a first framing section having a top portion and a bottom portion, and a second framing section having a top portion and a bottom portion;

said carriage pivotally connecting and supporting said top portion of said first framing section to said top portion of said second framing section for pivotal movement about a horizontal pivot axis overlying the vehicle body and being substantially parallel to said first path of travel wherein said first and second framing sections move between a raised position for allowing the vehicle body to enter and exit said welding station and a lowered position for clamping and welding the loosely assembled vehicle body;

a pair of substantially parallel outer rails being substantially parallel to said inner rails and supporting said first and second framing sections for movement of said framing assembly along said first path of travel when in said raised position;

a movable portion of said pair of outer rails at said welding station movable to a position displaced from the remaining portion of said pair of outer rails to pivotally move and support said first and second framing sections between said raised position and said lowered position;

means for manipulating movement of said movable portion of said pair of outer rails between said raised position, wherein said movable portion of said pair of outer rails is linearly aligned with said remaining portions of said pair of outer rails, and said lowered position, wherein said movable portion of said outer rails is displaced from said remaining portions of said outer rails;

a pair of spools connected to said bottom portion of said first and second framing sections;

a pair of locators for receiving and releasably locating said pair of spools when in said lowered position to locate said bottom portions of said first and second framing sections in a fixed orientation relative to said pivot axis;

means for clamping said vehicle body at predetermined locations when said framing assembly is in said lowered position, and said clamping means connected to said framing assembly;

means for welding the loosely assembled vehicle body at predetermined locations when said framing assembly is in said lowered position; and means for interchanging said framing assembly to adapt to a plurality of different, predetermined loosely assembled vehicle body configurations.

22. The framing apparatus stated in claim 21 wherein said carrier moves along a second path of travel, and said first path of travel is substantially parallel to said second path of travel.

23. The framing apparatus stated in claim 21 wherein said carrier moves along a second path of travel and said first path of travel is substantially perpendicular to said second path of travel.

24. The framing apparatus stated in claim 21 wherein said releasable locating means is fixedly connected to said welding station in a fixed, predetermined position.

25. The framing apparatus stated in claim 21 wherein said releasable locating means is connected to said carrier in a predetermined position.

26. The framing apparatus stated in claim 21 wherein said manipulating means comprises:

a linkage assembly having one end connected to said movable portion of said outer rails and another end connected to said welding station for supporting movement of said movable portion of said outer rails between said raised position and said lowered position; and means for powering movement of said linkage assembly between said raised position and said lowered position.

27. The framing apparatus stated in claim 21 wherein said interchanging means comprises:

a plurality of said carriages supported by said inner rails for movement along said first path of travel;

a plurality of said framing assemblies supported by said carriages and said outer rails for movement along said first path of travel when in said raised position and each one of said plurality of said framing assemblies adapted for framing different, predetermined loosely assembled vehicle body configurations; and means for powering movement of said plurality of said carriages and said plurality of said framing assemblies along said first path of travel until a predetermined one of said plurality of said framing assemblies is located at said welding station for clamping and welding a predetermined, loosely assembled vehicle body configuration.

28. The framing apparatus stated in claim 21 including:

said carrier randomly supplying said welding station with a plurality of different, predetermined loosely assembled vehicle body configurations; and means for identifying and responding to the random loosely assembled vehicle body configuration arriving at said welding station by having said interchanging means move a predetermined frame assembly into said welding station for clamping and welding the loosely assembled vehicle body.

29. The framing apparatus stated in claim 28 wherein said welding means comprises programmable robotic welders that respond to said identifying and responding means by automatically loading a predetermined computer program for welding the predetermined, loosely assembled vehicle body configuration at said welding station.

30. The framing apparatus stated in claim 21 including:

said carrier being movable along a second path of travel; and the vehicle body having a front to rear axis that is substantially parallel to said second path of travel.

31. The framing apparatus stated in claim 21 including:

said carrier being movable along a second path of travel; and the vehicle body having a front to rear axis that is substantially perpendicular to said second path of travel.

* * * * *